United States Patent [19]

Mott

[11] Patent Number: 4,668,102

[45] Date of Patent: May 26, 1987

[54] TEMPERATURE AND FLOW STATION

[75] Inventor: Richard C. Mott, Harwood Heights, Ill.

[73] Assignee: Honeywell Inc., Minneapolis, Minn.

[21] Appl. No.: 731,686

[22] Filed: May 8, 1985

[51] Int. Cl.⁴ .................................................. G01K 1/14
[52] U.S. Cl. ...................................... 374/142; 374/40; 374/138; 73/861.02; 73/861.65
[58] Field of Search .......... 73/861.01, 861.02, 861.03, 73/861.68, 861.65; 374/110, 142, 40, 41, 101, 138, 125, 135, 147, 143

[56] References Cited

U.S. PATENT DOCUMENTS

| | | | |
|---|---|---|---|
| 1,267,757 | 5/1918 | Gibson | 374/41 |
| 2,098,574 | 11/1937 | Doyle | 374/135 |
| 2,369,811 | 2/1945 | Stuart | 374/135 |
| 2,386,601 | 10/1945 | Fisher | 374/143 |
| 2,549,621 | 4/1951 | Moore, Jr. | 374/135 |
| 2,641,105 | 6/1953 | Drake | 374/135 |
| 2,697,349 | 12/1954 | Larkin | 73/861.68 |
| 2,703,494 | 3/1955 | Carney | 73/861.02 |
| 2,986,933 | 6/1961 | Summerlin et al. | 73/861.65 |
| 3,012,436 | 12/1961 | Meyers | 73/861.02 |
| 3,058,305 | 10/1962 | Leigh | 73/861.68 |
| 3,167,960 | 2/1965 | Miesiak | 374/138 |
| 3,706,228 | 12/1972 | Bush | 374/148 |
| 3,949,608 | 4/1976 | Abbey et al. | 374/110 |
| 4,047,379 | 9/1977 | Brookes et al. | 374/135 |
| 4,072,051 | 2/1978 | Peterson | 73/861.03 |
| 4,202,211 | 5/1980 | Perry | 73/227 |
| 4,217,777 | 8/1980 | Newman | 73/198 |
| 4,337,655 | 7/1982 | Sundstrom et al. | 73/861.03 |
| 4,414,634 | 11/1983 | Louis et al. | 73/861.03 |
| 4,419,898 | 12/1983 | Zanker et al. | 73/861.02 |
| 4,475,387 | 10/1984 | Hawk et al. | 73/861.02 |

FOREIGN PATENT DOCUMENTS

| | | | |
|---|---|---|---|
| 0616009 | 1/1949 | United Kingdom | 374/138 |
| 0752775 | 7/1956 | United Kingdom | 374/147 |
| 0821958 | 4/1981 | U.S.S.R. | 374/135 |
| 1147931 | 3/1985 | U.S.S.R. | 374/138 |

Primary Examiner—Charles Frankfort
Assistant Examiner—Thomas B. Will
Attorney, Agent, or Firm—Trevor B. Joike; John P. Sumner

[57] ABSTRACT

A system for determining the flow rate and temperature of air moving through a duct including a sampling or sensing head for sampling the air moving through the duct, a flow rate sensor connected to the sensing head for providing an output signal relating to the flow rate of air moving through the duct based upon the sampling of that air, and a temperature sensor connected to the sensing head for determining the temperature of the air moving through the duct based upon the sampling of the air moving through the duct.

19 Claims, 2 Drawing Figures

TEMPERATURE AND FLOW STATION

BACKGROUND OF THE INVENTION

The present invention relates to a system for sensing the flow rate and temperature of air moving through a conduit such as a heating and/or cooling duct and, more particularly, to such a system wherein signals representing flow rate and temperature are generated from a single sampling or sensing head.

A building's environmental control system most often includes a chiller and heating plant for supplying chilled and hot water to heat exchange coils located in the ducts of the various fan systems which distribute controlled air throughout the building. A fan system might include a fan which draws air from a mixing chamber which mixes outdoor air and return air and discharges that air through heating and cooling coils and humidifiers to the spaces supplied by the fan system.

Depending upon the sophistication of the control system for the air being supplied to the spaces of the building, various parameters will be controlled. For example, all systems will typically control the temperature of the space by controlling both the temperature and the amount of air being supplied to the space. In addition, humidity, static pressure, and air quality can all be controlled. Moreover, local codes often require a minimum amount of fresh air to be supplied to the spaces within a building. In such systems, therefore, it is necessary to sense both the temperature and the volume of the air being discharged to the spaces within a building. The sensing of the amount of air being supplied through a fan system is often determined by a flow station while the temperature of the air passing through a fan system is often determined by a separate temperature sensor.

SUMMARY OF THE INVENTION

The present invention incorporates both temperature sensing and flow sensing in a flow station by providing a sensing or sampling head for sampling air moving through a duct, a flow rate sensor connected to the sampling head for providing an output signal relating to the flow rate of air moving through the duct based upon the sampling of the air moving through the duct, and a temperature sensor connected to the sampling head for determining the temperature of the air moving through the duct based upon the sampling of the air moving through the duct.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
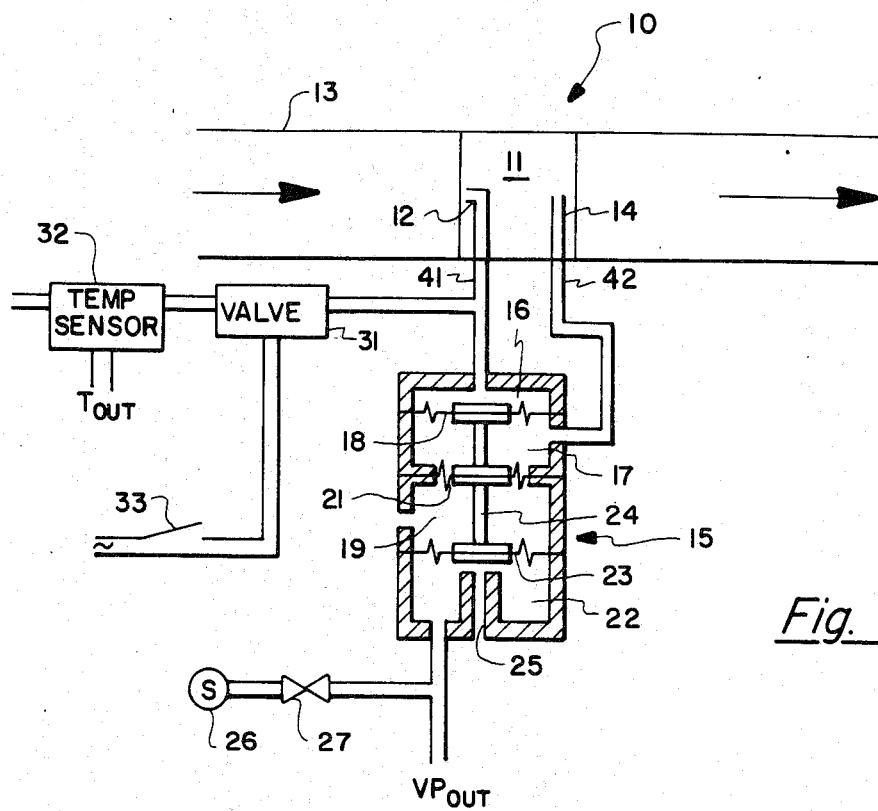
FIG. 1 shows one form of the flow station combining both temperature and flow rate sensing according to the present invention; and, FIG. 2 shows another form of a flow station combining both temperature and flow rate sensing according to the present invention.

Flow station 10 as shown in FIG. 1 comprises a sampling or sensing head 11 in the form of a pitot tube arrangement having a total pressure pickup tube 12 pointing upstream of the air moving through duct 13 and a static pressure sensing head 14 for sensing the static pressure inside duct 13. Total pressure sensing pickup tube 12 can actually be a plurality of such tubes located throughout a cross-section of duct 13 and manifolded together to give an average total pressure signal. The manifold is then connected to total pressure chamber 16 of amplifier 15. Likewise, static pressure sensing tube 14 can comprise a plurality of static pressure pickup tubes located throughout the duct and manifolded to provide an average static pressure across the duct. This manifold is then connected to static pressure chamber 17 of amplifier 15. In such case, tube 41 from the total pressure manifold becomes the total pressure tube and tube 42 from the static pressure manifold becomes the static pressure tube.

Total pressure chamber 16 of amplifier 15 is connected by tube 41 to tube 12 and static pressure chamber 17 is connected by tube 42 to tube 14. Chambers 16 and 17 are separated from one another by diaphragm 18. Atmospheric chamber 19 is separated from static pressure chamber 17 by diaphragm 21 and atmospheric chamber 19 is separated from control chamber 22 by diaphragm 23. Diaphragms 18, 21 and 23 are connected by connector 24 so that they all move in unison. Within chamber 22 is a nozzle 25 which ports to atmosphere. Control chamber 22 is supplied with pneumatic pressure from source 26 through restriction 27. The pressure within control chamber 22 therefore is dependent upon the distance between connector 24 from nozzle 25 as determined by the difference between the total pressure in total pressure chamber 16 and the static pressure in static pressure chamber 17.

Total pressure is comprised of velocity pressure and static pressure. Therefore, both the total pressure pickup tube 12 and the static pressure tube 14 are connected to amplifier 15 which subtracts the static pressure as sensed by tube 14 from the total pressure as sensed by tube 12. Since device 15 subtracts static pressure from the total pressure, the output from control chamber 22 is then VPout (output velocity pressure). This signal VPout relates to the flow rate of the air moving through duct 13.

In order to determine the temperature of the air moving through duct 13, valve 31 receives air from total pressure pickup tube 12. When valve 31 is energized by closing a switch 33, valve 31 permits duct air to flow through tube 12 and then through temperature sensor 32 which provides an output signal Tout to indicate the temperature of the air moving through the duct. Thus, the temperature sensor is not located within the duct itself but rather senses the air sampled by sensing head 11.

Accordingly, when switch 33 is closed, valve 31 is open and temperature sensor 32 provides its output signal Tout to indicate the average temperature of the air moving through duct 13. With switch 33 open, valve 31 is closed so that air is not diverted from total pressure pickup tube 12 to temperature sensor 32 and amplifier 15 is thus allowed to provide output signal VPout to indicate the velocity pressure of air moving through duct 13 indicative of the flow rate of air moving through duct 13.

Figure 2:
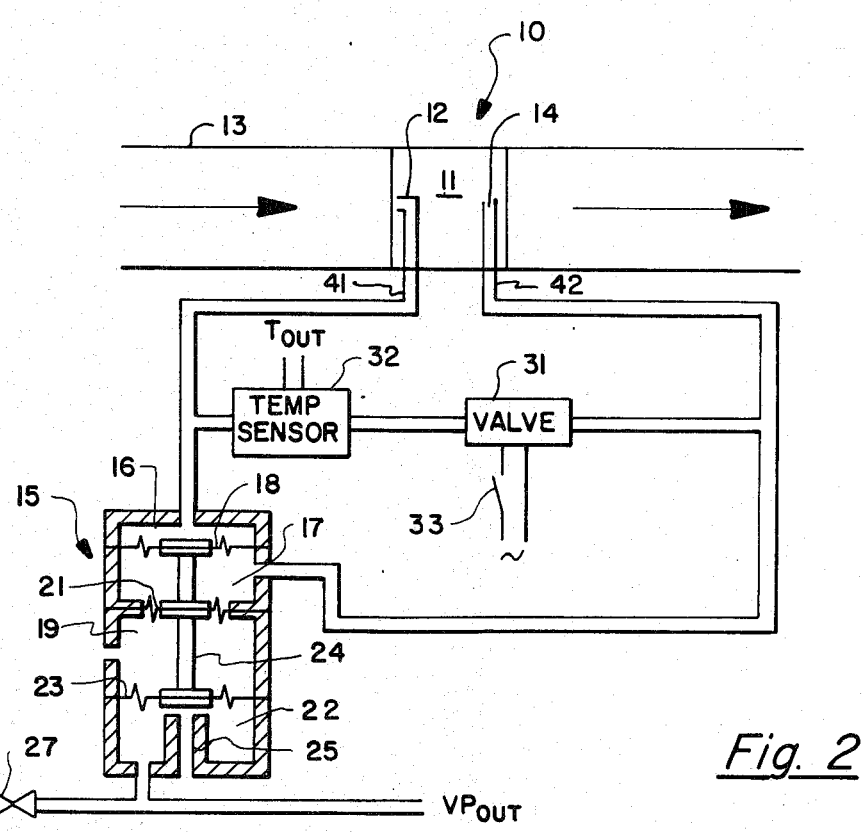

As shown in FIG. 2, valve 31 and temperature sensor 32 are connected between total pressure pickup tube 12 and static pressure pickup tube 14 instead of as is shown in FIG. 1. In the system shown in FIG. 2, when switch 33 is closed, valve 31 will open permitting flow from tube 12 to tube 14 through temperature sensor 32 since the pressure at nozzle 12 is higher than the pressure at nozzle 14. Temperature sensor 32 will produce an output signal Tout relating to the average temperature of the air moving through duct 13. When switch 33 is open, flow through temperature sensor 32 terminates and amplifier 15 will then produce an output signal VPout relating to the flow rate of the fluid moving through duct 13.

The embodiments of the invention in which an exclusive property or right is claimed are defined as follows:

1. A system for sensing the flow rate and temperature of air moving through a duct comprising:
   pitot tube sensing means comprised of at least one tube located to sense air moving through a duct;
   flow rate signal means connected to said at least one tube of said pitot tube sensing means for providing an output signal relating to the flow rate of air moving through said duct; and,
   temperature sensing means in selective fluid communication with said at least one tube of said pitot tube sensing means for providing an output signal relating to the temperature of air moving through said duct, said temperature sensing means including a valve for selectively permitting the flow of air through said temperature sensing means.

2. The system of claim 1 wherein said temperature sensing means is connected to divert air from said duct through said pitot tube sensing means to said temperature sensing means.

3. The system of claim 2 wherein said pitot tube sensing means comprises a total pressure pickup tube for picking up the total pressure of air moving through a duct and a static pressure pickup tube for picking up the static pressure within said duct.

4. The system of claim 3 wherein said temperature sensing means is in selective fluid communication with said total pressure pickup tube.

5. The system of claim 4 wherein said temperature sensing means comprises a temperature sensor and said valve is connected between said total pressure pickup tube and said temperature sensor for selectively permitting the flow of air from said total pressure pickup tube to said temperature sensor, said temperature sensor sensing temperature of air supplied to it by said valve.

6. The system of claim 5 wherein said flow rate signal means comprises an amplifier having a total pressure chamber connected to said total pressure pickup tube, a static pressure chamber connected to said static pressure tube, and a control chamber for providing an output signal based upon the difference between total pressure and static pressure.

7. The system of claim 3 wherein said temperature sensing means is in selective fluid communication with said total pressure pickup tube and said static pressure pickup tube.

8. The system of claim 7 wherein said valve is series connected with a temperature sensor connected between said total pressure pickup tube and said static pressure pickup tube, said valve selectively permitting the flow of fluid through said sensor from said total pressure pickup tube to said static pressure pickup tube, said temperature sensor sensing the temperature of air moving from said temperature pressure pickup tube to said static pressure pickup tube.

9. The system of claim 8 wherein said flow rate signal means comprises an amplifier having a total pressure chamber connected to said total pressure pickup tube, a static pressure chamber connected to said static pressure tube, and a control chamber for providing an output signal based upon the difference between total pressure and static pressure.

10. A system for determining the flow rate and temperature of air moving through a duct comprising:
    sampling means for sampling air moving through a duct;
    flow rate sensing means connected to said sampling means for providing an output signal relating to the flow rate of air moving through said duct based upon said sampling of said air moving through said duct; and,
    temperature sensing means in selective fluid communication with said flow rate sensing means for determining the temperature of the air moving through said duct based upon said sampling of said air moving through said duct, said temperature sensing means including a valve for selectively permitting the flow of air through said temperature sensing means.

11. The system of claim 10 wherein said temperature sensing means is connected to draw sampled air away from said flow rate sensing means and to said temperature sensing means to sense the temperature of said sampled air.

12. The system of claim 11 wherein said sampling means comprises at least a first tube.

13. The system of claim 12 wherein said temperature sensing means is in selective fluid communication with said first tube.

14. The system of claim 13 wherein said temperature sensing means comprises a temperature sensor and said valve is connected between said first tube and said temperature sensor for selectively permitting the flow of air from said first tube to said temperature sensor, said temperature sensor sensing temperature of air supplied to it by said valve.

15. The system of claim 14 wherein said flow rate signal means comprises an amplifier having at least a first pressure responsive chamber connected to said first tube, and a control chamber for providing an output signal relating to flow rate.

16. The system of claim 11 wherein said sampling means comprises at least first and second tubes.

17. The system of claim 16 wherein said temperature sensing means is in selective fluid communication with said first and second tubes.

18. The system of claim 17 wherein said valve is series connected with a temperature sensor connected between said first and second tubes, said valve selectively permitting the flow of fluid through said sensor from said first tube to said second tube, said temperature sensor sensing the temperature of air moving from said first tube to said second tube.

19. The system of claim 18 wherein said flow rate signal means comprises an amplifier having a first pressure chamber connected to said first tube, a second pressure chamber connected to said second tube, and a control chamber for providing an output signal based upon the difference between pressures in said first and second tubes.

* * * * *